July 28, 1942.  G. R. CUTHBERTSON  2,291,213
MANUFACTURE OF CELLULAR MATERIAL

Filed March 27, 1937

INVENTOR.
GEORGE R. CUTHBERTSON
BY Gourley & Budlong
ATTORNEYS

Patented July 28, 1942

2,291,213

UNITED STATES PATENT OFFICE 2,291,213

MANUFACTURE OF CELLULAR MATERIAL

George R. Cuthbertson, Passaic, N. J., assignor, by mesne assignments, to United States Rubber Company, New York, N. Y., a corporation of New Jersey Application March 27, 1937, Serial No. 133,377

6 Claims. (Cl. 18—53)

This invention relates to the manufacture of expanded materials, and more particularly to an improved method of making cellular materials.

Broadly, the present invention comprises evolving a suitable inflating gas within the body of the material to be expanded, while preventing substantial expansion of the volume of the material. According to the invention, solid rubber or rubber-like compositions are mixed with substances capable of liberating or generating a gas within the body of the solid stock. The mixing may be carried out in any suitable manner and after the mixing operation a mass of the stock, of suitable thickness, is treated to allow the gas to be liberated or generated within the stock, while the expansion of the stock is restrained. Subsequently, the pressure is released to permit expansion of the mass containing the confined gas, and the mass is then cured to any desirable degree of cure by means of heat or otherwise.

Preferably, the gas is generated within rubber by chemical action, such as by means of the known interaction of nitrites and ammonium salts to evolve nitrogen, for example, by the reaction of sodium nitrite with ammonium acetate. Instead of nitrogen, other gases for which rubber has a low permeability coefficient approximating that for nitrogen may be generated or liberated within the stock, for example, carbon monoxide and methane. Supplementary gas-forming chemicals may be included in the composition which are adapted to yield additional inflating gas at the temperature of the final vulcanization. This effect can be used to create additional pressure inside the already expanded mass or to provide further expansion of the mass during final vulcanization.

The type of cellular products obtained by the present invention may range from the soft variety, such as soft rubber, to products of the nature of hard rubber or ebonite.

The rubber or rubber-like material may contain the usual vulcanizing ingredients, including sulphur, accelerators, or other desired compounding ingredients. Further, the gas-forming chemical or chemicals may be incorporated with the rubber while it is in the dispersed form as in natural latex or as in artificially-prepared dispersions, and the composition thereafter reduced to a solid or semi-solid state by removing water.

Figure 1:
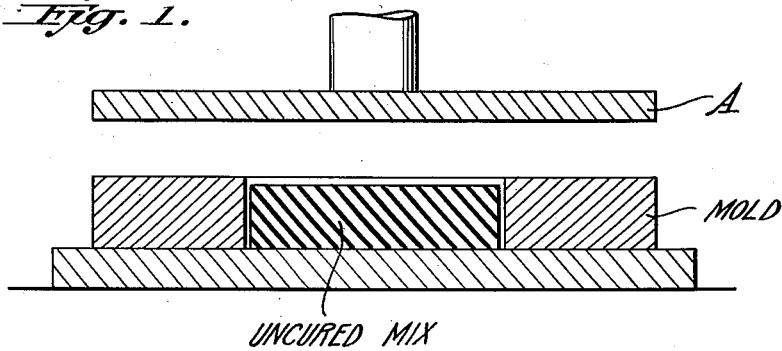
Figure 2:
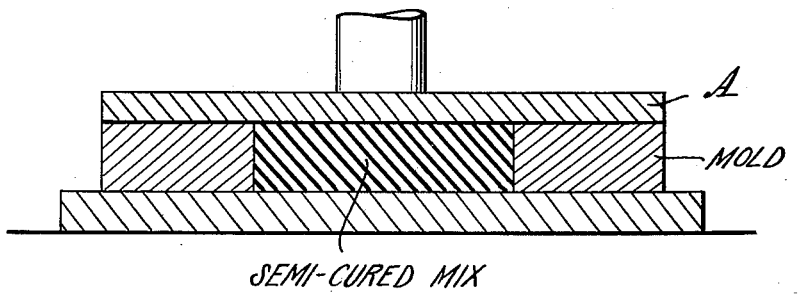
Figure 3:
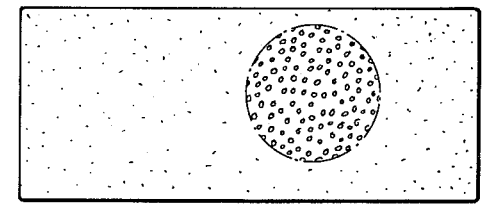

More particularly rubber is compounded on a mill with the desired vulcanizing, accelerating and compounding ingredients, and a gas-forming chemical is introduced into the rubber mix on the mill. The stock is then shaped to the desired thickness and confined in a mold to substantially fill it, as illustrated in Figure 1 in cross section, and the mold containing the material is then placed in a heater where it is given a preliminary heating to accelerate the liberation of gas. The heater may be a hydraulic steam heated press having a movable platen A, illustrated in Fig. 1 above the mold before lowering it as shown in Fig. 2. The stock is restrained from expanding by the positive unyielding pressure exerted by the platen of the hydraulic press. Sufficient heat is applied to liberate gas. For the closed cell type of product which is desired, as distinguished from the broken cell sponge-like type of product, the rubber stock at this stage should be of sufficient toughness and stiffness to restrain the confined gas so that when the pressure is removed the gas will not rupture the cell walls. To provide this, the stock may be given a slight cure prior to, concurrently with, or directly after the formation or liberation of the gas. The slight cure may be carried out in any suitable manner. In the preferred form of the invention sufficient heat is applied to liberate the gas and then the temperature is raised to a sufficiently higher temperature to partially cure the rubber the system then being as illustrated in Fig. 2, wherein there has been partial cure and gas evolution but which gas is in solution in the rubber. After this semi-cure, the press is opened, and the external pressure on the rubber is released as by removal from the mold, whereby substantial expansion of the stock occurs as illustrated in Fig. 3, a section being magnified to indicate the closed gas pockets. The vulcanization of the expanded stock is then completed in any suitable manner, usually in a similar but larger mold. Further expansion may or may not be permitted during the final vulcanization yet retaining the unbroken type of cellular structure substantially throughout the mass.

Generally, any suitable proportions of the gas-forming chemicals may be incorporated as determined by the extent of expansion desired and as will be well known to those skilled in the art. Enough of the gas-forming material is added to liberate the desired volume of gas.

Since rubber and rubber-like materials have relatively low permeability coefficients for nitrogen and carbon monoxide, these gases are more suited for this process than those gases for which the permeability coefficient is high such as carbon dioxide.

The term "rubber" as used herein, is to be construed broadly as including all types of natural rubber including balata and gutta-percha, dried latex, reclaimed rubber, and synthetic rubber-like materials such as olefine polysulphide and polychloroprene plastics, and the like.

The herein described process provides a number of advantages over hitherto known methods of making similar products. A high pressure gassing chamber is unnecessary thereby avoiding the expense, limited capacity, and hazards of operation accompanying the use of such a device. In distinction, the gassing step of the present process may be carried out in ordinary apparatus such as platen presses or closed molds, and in a very short period of time as compared to such known methods of making cellular rubber products.

A further advantage is that there are less limitations herein as compared with the known gassing chamber methods as to the extent to which the final product may be readily expanded and yet retain the unbroken type of cellular structure substantially throughout the mass.

It is understood that numerous minor changes may be made in the process without departing from the spirit of the invention and it is intended that the patent shall cover by suitable expressions in the appended claims whatever features of patentable novelty reside in the invention.

Having thus described my invention, what I claim and desire to protect by Letters Patent is:

1. In a process of producing a cellular soft vulcanized rubber product the steps of chemically generating from a non-gaseous chemical blowing agent, adapted to leave a non-gaseous residue, a substantially inert inflating gas for which rubber has a permeability coefficient approximating that for nitrogen, within the body of a vulcanizable rubber mass confined in a mold to substantially fill it, while preventing substantial expansion of the mass by the exercise of positive unyielding pressure from a solid surface, partially curing the rubber while preventing substantial expansion of the mass, subsequently permitting expansion of the mass to form closed gas pockets and then completing vulcanization of the rubber to the soft vulcanized rubber state.

2. In a process of producing a closed cell cellular vulcanized rubber product, the steps of generating nitrogen gas by chemical reaction and heat, from a non-gaseous chemical blowing agent adapted to leave a non-gaseous residue, within the body of a vulcanizable rubber mass confined in a mold to substantially fill it, while preventing substantial expansion of the mass by the exercise of positive unyielding pressure from a solid surface, partially curing the rubber while preventing substantial expansion of the mass, subsequently permitting expansion of the mass and then completing vulcanization of the rubber.

3. The method of making closed-cell cellular soft vulcanized rubber, which comprises rigidly externally confining a mass of soft-rubber compound containing a non-gaseous chemical blowing agent adapted to evolve a substantially inert inflating gas for which rubber has a permeability coefficient approximating that for nitrogen, said chemical blowing agent being capable of leaving a non-gaseous residue, heating the confined mass whereby to liberate said gas and vulcanizing it, under conditions which preclude penetration of gas into the mass from the outside, to the point where it acquires a consistency and tensile strength sufficient to prevent entrapped gas from rupturing the rubber, and then releasing such confinement and completing the vulcanizing of the mass under conditions that cause gas to be evolved within the mass to expand it to produce a closed-cell cellular soft vulcanized rubber.

4. The method of making closed-cell cellular soft vulcanized rubber which comprises rigidly externally confining a mass of soft rubber compound containing a non-gaseous chemical blowing agent capable of freeing nitrogen gas by the action of heat and leaving a non-gaseous residue, heating the confined mass to liberate said gas and leave said residue and vulcanizing the mass while rigidly restraining substantial expansion thereof, under conditions which preclude penetration of gas into the mass from the outside of the mass, said vulcanization being carried to such point that the mass acquires a consistency and tensile strength sufficient to prevent said gas from rupturing the rubber, and then releasing such confinement and completing the vulcanizing of the mass to produce a closed-cell cellular soft vulcanized rubber.

5. The method of making closed cell cellular vulcanized rubber which comprises rigidly externally confining a mass of vulcanizable rubber compound containing a non-gaseous chemical blowing agent adapted to evolve nitrogen gas by the action of heat and leave a non-gaseous residue, heating the confined mass to liberate said gas and vulcanizing it while rigidly restraining substantial expansion thereof, said vulcanization being carried to such point that the mass acquires consistency and tensile strength sufficient to prevent entrapped gas from rupturing the rubber, and then releasing such confinement and completing the vulcanizing of the mass to produce a closed cell cellular vulcanized rubber.

6. A closed cell cellular vulcanized rubber whose cells contain nitrogen gas and the non-gaseous residue of a non-gaseous chemical blowing agent.

GEORGE R. CUTHBERTSON.